United States Patent Office 3,087,808
Patented Apr. 30, 1963

3,087,808
PROCESS FOR CLEANING AND DEGASSING MOLTEN ALUMINUM AND ALUMINUM ALLOYS
Roy F. Gottschalk, Homewood, Ill., assignor to Chemetron Corporation, Chicago, Ill., a corporation of Delaware
No Drawing. Filed July 28, 1960, Ser. No. 45,798
3 Claims. (Cl. 75—68)

This invention relates to a process of treating molten metals, and more particularly to a process for removing impurities from molten aluminum and aluminum alloys without any appreciable loss of magnesium.

Hydrogen gas and oxide inclusions as found in precast aluminum and its alloys are a familiar problem to metal producers. Removal and control of these inclusions are particularly bothersome in the melting and casting of these metals. Objectionable oxides are easily detected by their effect on physical properties, surface finish, machining quality, and on drawing operations. It is essential therefore that melting operations minimize the generation of oxides or the possible inclusion of formed oxides, as well as remove undesirable included hydrogen gas.

The injection of chlorine gas under pressure below the surface of the melt for removal of dissolved hydrogen and included oxides is well known in the art. Although this manner of hydrogen and oxide removal is not thoroughly understood, nevertheless very satisfactory results are obtained consistently with this chlorine technique.

Likewise, the injection of an inert gas or other gases dissimilar to hydrogen such as nitrogen, for the removal of dissolved hydrogen and included oxides is also well known in the art. This technique usually involves a combination of agitation, cooling, and partial pressure gas diffusion. The agitation involved makes possible a large scavenging gas-metal interface between a gas essentially free of hydrogen and a molten metal which contains a relatively large amount of dissolved hydrogen. By this technique, the removal of hydrogen and other dissolved gases occurs by diffusion into bubbles of the injected gas.

Unfortunately, both of these above techniques present problems. The technique employing chlorine alone results in objectionable fumes presenting a severe need for ventilation. It is a well known fact that chlorine gas itself is deadly and precautionary measures should always be taken when working with this gas, such as providing proper ventilation.

Another possible objection to injecting pure chlorine gas below the surface of the aluminum melt is the removal of magnesium that occurs. It has been theorized that chlorine when injected below the surface of the melt in 100% concentration reacts with magnesium by forming a magnesium chloride vapor that is lost and never recovered. This of course, affects the composition of the finished product which may be objectionable if it is preferred that the same magnesium content be present after treatment.

Thus, it is highly desirable that magnesium removal be minimized if the same composition of the finished product is desired, and the treatment time decreased without sacrificing quality.

It is proposed therefore as a primary object of this invention to provide a nitrogen-chlorine gaseous mixture for flushing molten aluminum and aluminum alloys to remove undesirable gases and non-metallic inclusions contained in the melt without sacrificing any appreciable magnesium content.

It is more particularly an object of this invention in accordance with the above object to provide a process utilizing a gaseous flushing mixture containing substantially more nitrogen than chlorine.

It is still more particularly an object of this invention in accordance with the above objects to provide a process utilizing a gaseous mixture between the ratios of 1%–30% by volume of chlorine to 99%–70% by volume of nitrogen.

It is still another object of this invention to provide a process for degassing and cleaning molten metals faster without decreasing the quality of the product by loss of magnesium.

Other objects and advantages of this invention will become more apparent as the following description proceeds.

In a series of tests made, a gaseous mixture of nitrogen and chlorine was prepared and metered for sub-surface injection, containing 1% to 30% chlorine. The proportioning apparatus used was designed to provide gas flows from 10 cubic feet per hour to 90 cubic feet per hour of nitrogen and chlorine gases in various proportions. Interesting results occurred. For instance, it was found that with a gaseous mixture of 10% chlorine and 90% nitrogen, no objectionable fumes or odors were experienced from a bath of one foot or more in depth with gas flows under 60 cubic feet/hour per lance. Any lance of conventional construction may be employed and in the test referred to, it was inserted into the melt to the bottom of the container, or ladle. For bath depths under one foot, the chlorine content of the gaseous mixture was reduced to 3% with satisfactory removal of hydrogen gas and without deleterious chlorine fumes. This is significant as chlorine contents above 10% did not increase the rate of hydrogen gas removal, but did produce objectionable chlorine odors. Flushing tests on large heats using up to 100 cubic feet per hour per lanch, of a 10% chlorine–90% nitrogen mixture showed from analysis of samples taken from the aluminum alloys flushed, that the hydrogen gas content was reduced progressively with increased time of treatment. Here again, there were no objectionable fumes. This also held true when this mixture was used to flush twenty thousand to sixty-five thousand pound heats made in reverberatory furnaces. Thus a 90% nitrogen–10% chlorine gaseous mixture was found to produce the best results. Mixtures above 10% chlorine presented increasing fume problems while mixtures below 10% chlorine content, at least for large bath depths, resulted in the dross skimmings becoming "wetted" with aluminum metal, which is undesirable.

The degree of hydrogen gas removal from melts varied from furnace to furnace during the tests. In flushing the metal in the furnace shell with exposure to the combustion atmosphere, the gas content as indicated in vacuum solidified samples varied up and down with flushing time at levels less than a highly gassed state. Subsequent treatment of the metal in the outside charging well, or in a ladle of tapped metal, reduced the gas content and increased the metal density to an acceptable level. As a result of these observations, it was concluded that the combustion products from the burners in the furnace shell were effecting an equilibrium balance of hydrogen in the metal and in the surrounding atmosphere.

Although the gas was not completely removed by flushing in the presence of the combustion atmosphere, it was observed that considerable amounts of flux and dross particles were removed from the bath. When the lance was moved along the hearth, large flux and dross particles were loosened and brought to the surface of the bath. As the resulting dross on the bath was satisfactorily "dry" after flushing no excessive metal carryoff was experienced.

The over-all evaluation of satisfactory treatment with 90% nitrogen–10% chlorine mixtures has shown that the consumption of injected gas will vary from 0.5 cubic foot to 2.0 cubic feet per 100 pounds of aluminum. It was found that degassing was achieved if the surrounding atmosphere did not contain excessive combustion products or if excessive agitation did not occur. The delivery of the flushing gas was controlled to provide a "rolling" bubble, and not a "breaking" bubble.

In making these tests, a range of gas mixtures was used to determine the most suitable combination of gases before the preferable 90% nitrogen–10% chlorine mixture was discovered. The use of the 90% nitrogen–10% chlorine gaseous mixture has a marked advantage for instance, over 100% chlorine injection, namely in minimizing magnesium removal from the melt. Typical data on magnesium removal for an aluminum alloy is as follows:

*Test Results for Process*

| Treatment | Quantity of aluminum treated, pounds | Magnesium removal, percent by weight |
|---|---|---|
| 100% Cl₂ | 60,000 | 0.10 |
| 100% Cl₂ | 2,000 | 0.04 |
| 90% N₂–10% Cl₂ | 60,000 | 0.02 |
| 90% N₂–10% Cl₂ | 2,000 | 0.01 |
| 90% N₂–10% Cl₂ | 400 | 0.01 |

It will be noted from these data that there is as much as 0.08% difference in magnesium removal when large quantities of aluminum are treated with 100% chlorine as compared to a 90% nitrogen–10% chlorine mixture. It has been found that for quantities of melt up to 65,000 lbs. the magnesium content removal is limited from about 0.01% to about 0.02% by weight. In the smaller quantities of aluminum treated, 2000 lb. quantities for example, there was still as much as 0.03% difference. In very small quantities, such as 400 lbs., the magnesium removal was virtually negligible at 0.01%. It thus becomes apparent that with lesser magnesium removal from aluminum and aluminum alloys, a denser, cleaner metal is produced by the flushing operation with a 90% nitrogen–10% chlorine gaseous mixture, and this is a highly desirable factor to the aluminum industry.

In my copending application, Serial No. 45,861, filed July 28, 1960, there is disclosed a flushing cap for maintaining a gaseous blanket on the surface of the melt directly above the locus of the agitable area. In this mentioned application, nitrogen is injected below the surface of the melt to produce a rapid agitation of the melt causing the included hydrogen to enter the nitrogen bubble and be carried to the surface within the flushing cap. Nitrogen gas is also passed into the flushing cap to prevent the tendency of the melt to reabsorb the hydrogen by reacting with the atmospheric moisture. Thus, the process of utilizing a 90% nitrogen–10% chlorine gas mixture could be used to good advantage with this apparatus of my copending application. However, a straight tube lance has proven satisfactory, but if hydrogen reabsorption is a problem, which would not be likely, the flushing cap could be utilized to eliminate this difficulty. Another advantage of using the flushing cap is that the flux and dross particles loosened by the agitation of the melt rise and agglomerate under the cap, which permits easy removal from this confined area after termination of the flushing operation.

Having described my invention, what is claimed is:

1. A process for degassing and purifying a light molten metal bath containing included hydrogen gas and consisting essentially of aluminum and containing minor amounts of magnesium comprising introducing under pressure and substantially at the bottom of the bath a gaseous mixture consisting essentially of from about 3% to about 10% by volume of chlorine and from about 97% to about 90% by volume of nitrogen and agitating said bath with said gaseous mixture thus introduced to flush the melt of included hydrogen gas and to purify the melt of impurities and provided that the amount of magnesium removed from the bath is limited to about .02% by weight.

2. A process for degassing and purifying a light molten metal bath containing included hydrogen gas and consisting essentially of aluminum and containing minor amounts of magnesium comprising introducing under pressure and substantially at the bottom of the bath a gaseous mixture consisting essentially of about 10% by volume of chlorine and about 90% by volume of nitrogen and agitating said bath with said gaseous mixture while reacting said gaseous mixture with the metal bath to flush the melt of included hydrogen gas and to purify the melt of impurities and provided that the amount of magnesium removed from the bath is limited to about .02% by weight.

3. A process according to claim 2 wherein the magnesium content removed is limited to from about .01% to .02% by weight for quantities of melt up to 65,000 pounds.

References Cited in the file of this patent

UNITED STATES PATENTS

| 2,821,472 | Peterson et al. | Jan. 28, 1958 |
| 2,840,463 | Stroup et al. | June 24, 1958 |

FOREIGN PATENTS

| 138,515 | Great Britain | Aug. 28, 1947 |
| 738,510 | Great Britain | Oct. 12, 1955 |